Inventors
Olaf Rasmussen &
Perry L. Tenney
By Blackmore, Spencer & Flint
Attorneys Jan. 26, 1937. P. L. TENNEY ET AL 2,068,716

TRANSMISSION CONTROL

Filed Sept. 17, 1932 4 Sheets-Sheet 4

Inventors
Olaf Rasmussen &
Perry L. Tenney
By Blackmore, Spencer & Flint
Attorneys Patented Jan. 26, 1937

2,068,716

UNITED STATES PATENT OFFICE 2,068,716

TRANSMISSION CONTROL

Perry L. Tenney and Olaf Rasmussen, Lansing, Mich., assignors to General Motors Corporation, Detroit, Mich., a corporation of Delaware Application September 17, 1932, Serial No. 633,615

17 Claims. (Cl. 192—.01)

This invention relates to control mechanism for power transmission, and may be described as a semi-automatic control for a vehicular change speed transmission.

An object of the invention is to simplify the control of the ratio changes provided by the transmission.

Another object is to provide for progressive ratio changes controlled preferably by the movement of the engine throttle-operating means.

Another object is to provide for sequential clutch releasing and progressive gear shifting operations.

Still another object is to provide for such an automatic gear shifting arrangement as shall be adapted to permit any desired manual shifting at any time.

A still further object relates to the association of a free wheeling device with an automatic gear shifting control, the arrangement being such that the automatic gear shifting control is rendered inoperative whenever the free wheeling device is inoperative.

Other objects will be understood from the following description.

In the drawings—

Figure 1:
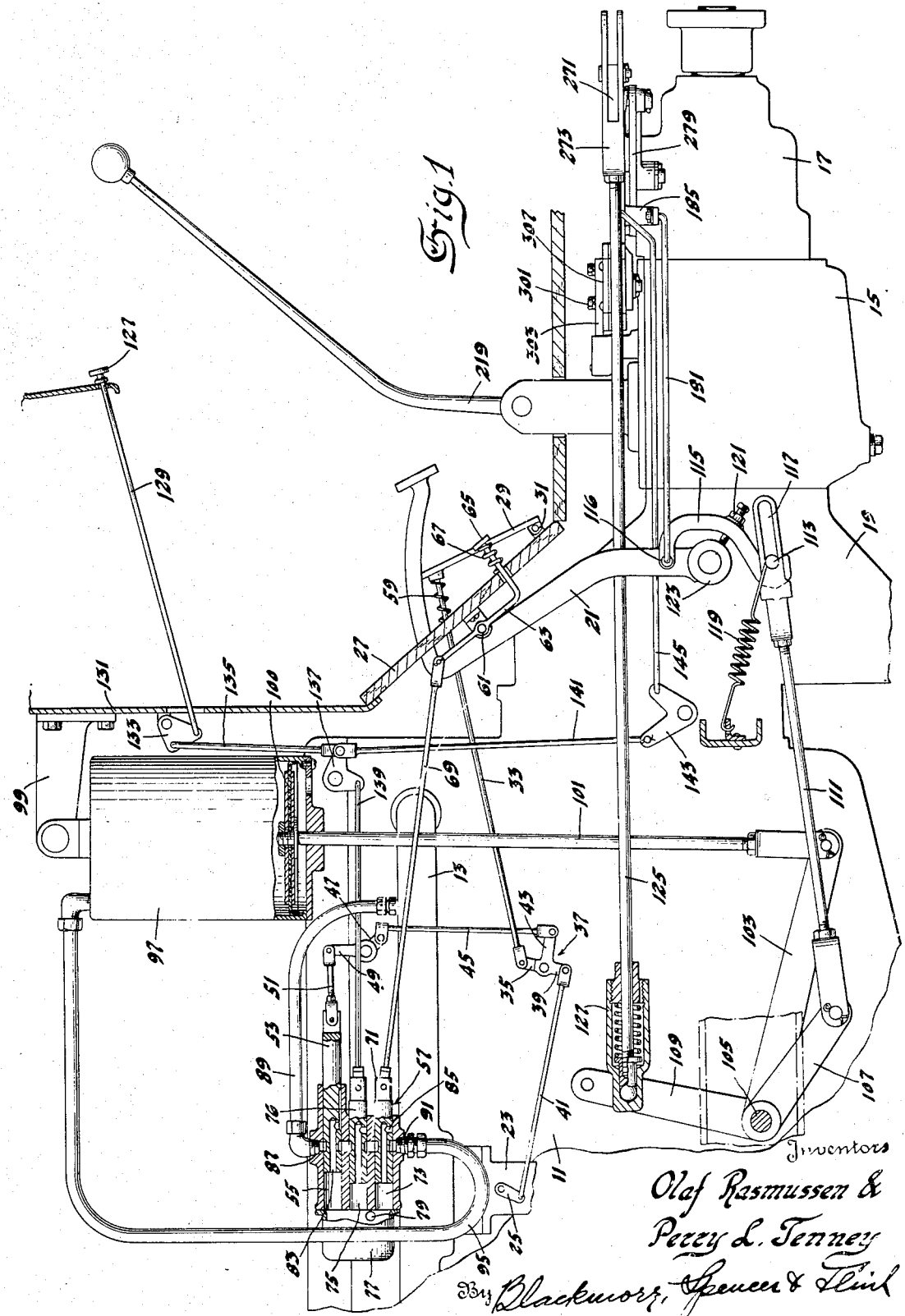
Fig. 1 is a view in elevation of an engine and the transmission of a motor vehicle having the novel control associated therewith.

Referring by reference characters to the drawings, the engine of the vehicle is represented by numeral 11. It has an intake manifold 13. At 15 is the housing for the change speed transmission, and to the rear of this housing is another, 17, containing an overrunning clutch constituting a free wheel unit. At 19 is the housing for the clutch between the engine crankshaft and the transmission. The clutch is to be operated by a substantially conventional pedal 21.

In the header 23 communicating with the manifold 13 is a throttle valve controlled by an external lever 25. On the floor board 27 of the car is an accelerator pedal 29 pivoted at 31. This pedal is connected by a rod 33 to one arm 35 of a three-arm lever 37. A second arm 39 is connected by a link 41 to the throttle control lever 25. A third arm 43 is connected by a link 45 to a lever 47, the second arm 49 of which lever is connected by a rod 51 to the end of a valve plunger 53 operable in cylinder 55 of a valve body designated as a whole by numeral 57. A spring 59 holds the accelerator pedal in its released position.

Beneath the floor board is a lever 63 pivoted at 61. This lever has an arm extending through the floor and terminating in a button 65. The lever is held in its released position by a spring 67. A rod 69 connects this lever with a plunger 71 operable in a cylinder bore 73 also formed in valve member 57.

Figure 9:
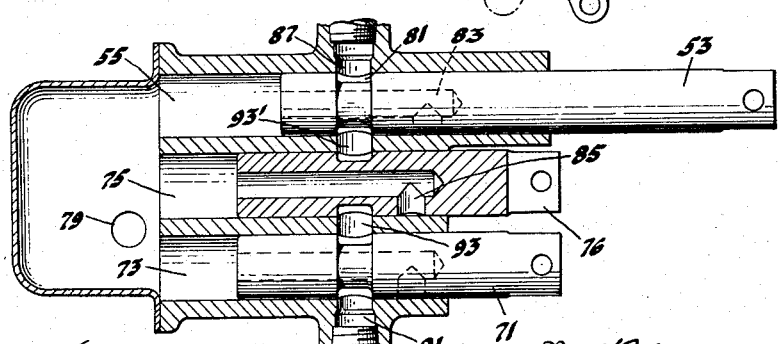
Fig. 9 is a transverse section through the valve member.

Between the tubular passages 55 and 73 is a third parallel passage 75. In this passage moves a third plunger 76. A cover 77 closes the open ends of the three passages and is provided with one or more suitable openings such as 79 communicating with the outer air. Each valve plunger has an annular groove 81 (Fig. 9), a tubular bore 83 and, extending from the bore, a radial passage 85. In the outer wall of the valve body is an opening 87 communicating with passage 55. From this opening 87 a pipe 89 extends to the intake manifold. Diametrically opposite opening 87 is an opening 91 communicating with passage 73. In the walls between the several bores are apertures 93 and 93', which apertures are in alignment with openings 87 and 91. A pipe 95 connects the opening 91 with a power cylinder 97 suitably supported as at 99.

Within the power cylinder is a piston 100 having a rod 101 which connects to a lever arm 103 extending from a spindle 105 to which spindle are also connected other arms 107 and 109. A rod 111 is connected to arm 107. At its other end rod 111 engages a bracket arm 115 beyond which it is forked to straddle the bracket. Bracket 115 is pivoted to the clutch pedal as shown at 116. The forked ends of rod 111 are slotted as at 117 through which slots extend the spindle end of a conventional clutch throw-out lever 113. The end of the throw-out lever is held, by a spring 119, in contact with the bracket 115. A screw 121 is adjustably held in bracket 115 and engages the hub 123 of the clutch pedal 21. By these expedients the clutch may be released by pressure on the pedal or by a push through rod 111. A rod 125 is connected by a suitable resilient element 127 to arm 109. The rod 125 is operable to shift the transmission ratios in a way to be described below.

On the instrument panel is a button 127 for controlling a free wheel lock-out jaw clutch. From the button a rod 129 extends through the dash 131 and is connected to a lever 133 pivoted on the front side of the dash. From lever 133 a rod 135 extends to a second lever 137. A rod 139 connects this second lever to the intermediate valve plunger 76. Also, from the second lever extends a rod 141 to a bell crank lever 143. From the second arm of the bell crank lever a rod 145 extends to and is connected with an arm 147 (Figs. 2 and 5) carried by a spindle 149 rotatably mounted in the top of housing 17. Within the housing 17 the spindle 149 is provided with a forked arm 151, the furcations of which straddle the upturned end of an angle plate 153, the other end of which angle plate is connected by a pin 155 to a fork 157 whereby the rocking of spindle 149 may reciprocate the fork 157. The ends 159 of fork 157 engage in a channel 161 (Fig. 3) of a sliding sleeve 163. The sleeve 163 is in slidable but non-rotating relation with an inner end of the driven shaft 165, there being splines as at 167 to provide for the connection.

Slidably splined on the output shaft of the change speed transmission is an inner hub 171 and between this inner hub and the outer sleeve 163 is a substantially conventional overrunning clutch 173. In addition to its spline connection with sleeve 163, shaft 165 has internal clutch teeth 175 adapted to be engaged by external teeth 177 on hub 171 when the hub and sleeve are reciprocated together toward the rear by the fork 157.

Figure 5:
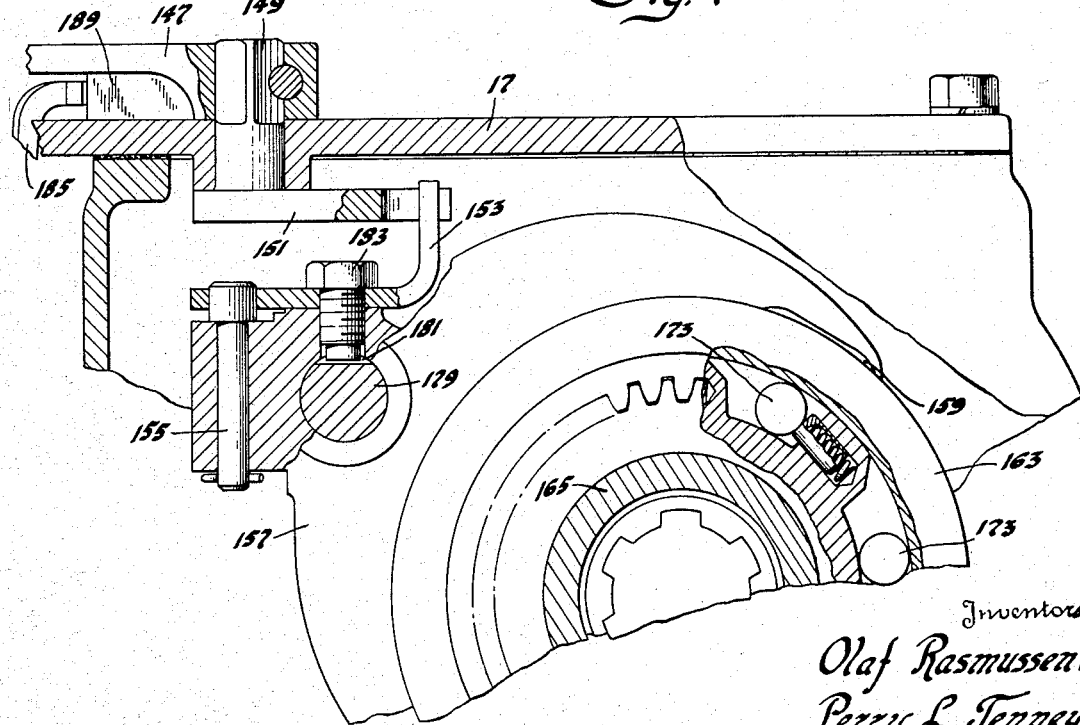
Fig. 5 is a transverse section through the free wheel unit.

The low speed and reverse shift rail 179 extends from the change speed housing 15 into the free wheel housing 17 and reciprocates through the fork 157 as clearly shown in Fig. 5. This shift rail 179 has a shoulder 181 to engage a pin 183 extending through the horizontal arm of the angle plate 153 and partly through the fork member 157 so that the rearward reciprocation of the reverse rail 179 manipulates the free wheel lock-out jaw clutch in a manner which will be obvious from an inspection of Fig. 3 and Fig. 5.

At 185 is a lever pivoted on the top of the housing 17. This lever has a lug 187 engaging a part 189 on lever 147 to prevent the shifting of the lock-out device. Before shifting the fork 157, lever 185 must be rocked to remove lug 187 from the path of movement of the part 189. Rocking of lever 185 is performed by the clutch releasing action. To permit the clutch to so function a rod 191 is connected to an arm of lever 185 and to the clutch pedal 21.

Figure 4:
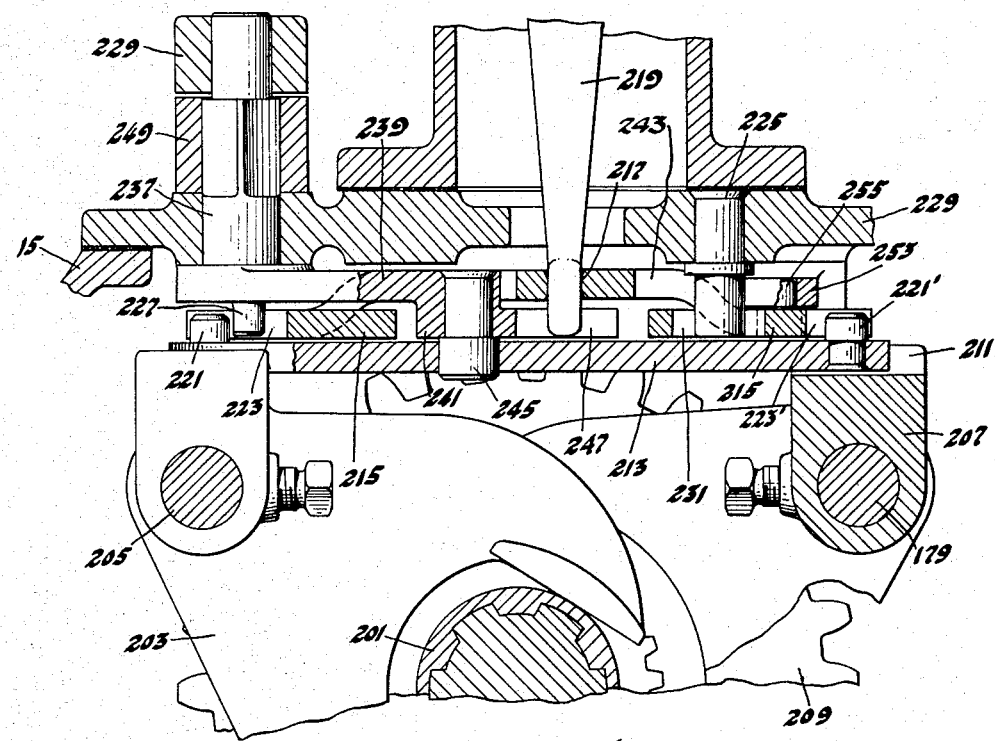
Fig. 4 is a section on line 4—4 of Fig. 3.

The change speed gearing is not of itself new and is not fully illustrated. It may be sufficient to explain that a spline shaft 201 is movable axially to be clutched to the driving shaft or to a driven gear to provide direct or high speed in one position of adjustment and to provide second speed in another position of adjustment. Preferably associated with the jaw clutches are frictional clutches to be first engaged, whereby synchronization is accomplished before the engagement of the jaw teeth. These shifts are made by a fork 203 (see Fig. 4) carried by the high speed shift rail 205. The low and reverse shift rail 179, referred to above, carries a fork 207 only partially shown. This low speed fork shifts a gear 209 slidably splined on shaft 201 to effect gear engagement for producing low speed and reverse drive in its positions of adjustment. On the top of each fork is a groove, such a groove 211 being shown on fork 207 on Fig. 4. These grooves or channels receive the ends of a lever 213. If one end of the lever be anchored, force applied longitudinally to the lever will move the unanchored end about the anchored end as a fulcrum. The fork associated with the unanchored end is thereby moved longitudinally for making gear shifts. Provision is made to anchor either end as may be desired in order to make the required shifts. An interlocking plate 215 is bowed upwardly at its mid portion and downwardly at each end. Its mid portion has a slot 217 for the passage of the shift lever 219 during the longitudinal movement of the latter. Pins 221, 221' on the ends of lever 213 extend into slots 223, 223' at the ends of the interlocking plate. This plate is guided for transverse movement only by pins 225 and 227 extending downwardly from the cover plate 229 and entering slots 231 and 223 respectively at the corresponding ends of the interlocking plate. The slot 223 engages around pin 221 of the lever 213 when the interlocking plate is shifted laterally in one direction. In this way the interlocking plate, which moves transversely only, locks the end of the lever carrying pin 221. Similarly, if the interlocking plate is moved transversely in the opposite direction a slot 223' engages around pin 221' and that end of lever 213 becomes a fulcrum. These transverse movements of the interlocking plate may be made by manual effort applied to the lever 219 the lower end of which engages the side walls of slot 217 in the plate or may be made by automatically operable mechanism to be described below. When the movements are effected by the lever 219 (the lever moving the interlocking plate through pressure on the walls of slot 217) the one or the other end of the lever 213 is fixed and thereafter longitudinal movements of the shift lever 219 rock the lever 213 about its fulcrum to make the shifts into the speed ratio positions as usual.

Figure 2:
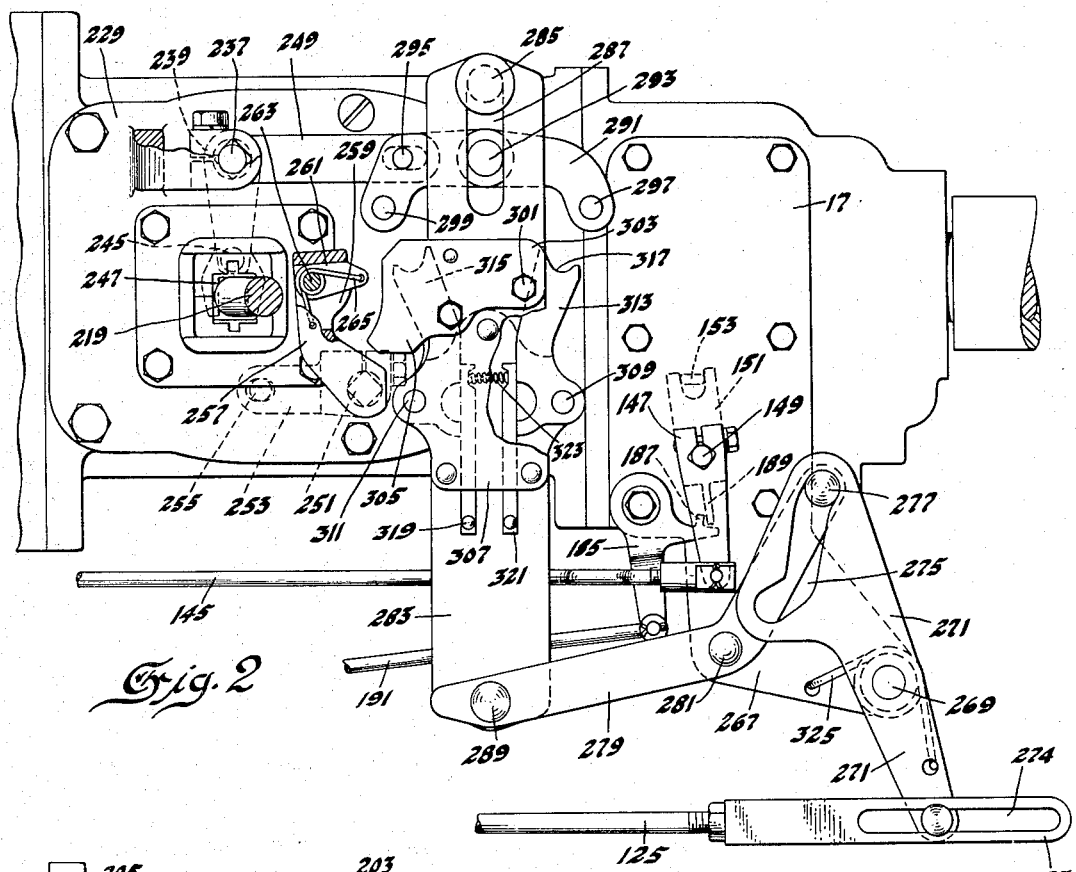
Fig. 2 is a top plan view of the change speed and free wheeling units.
Figure 3:
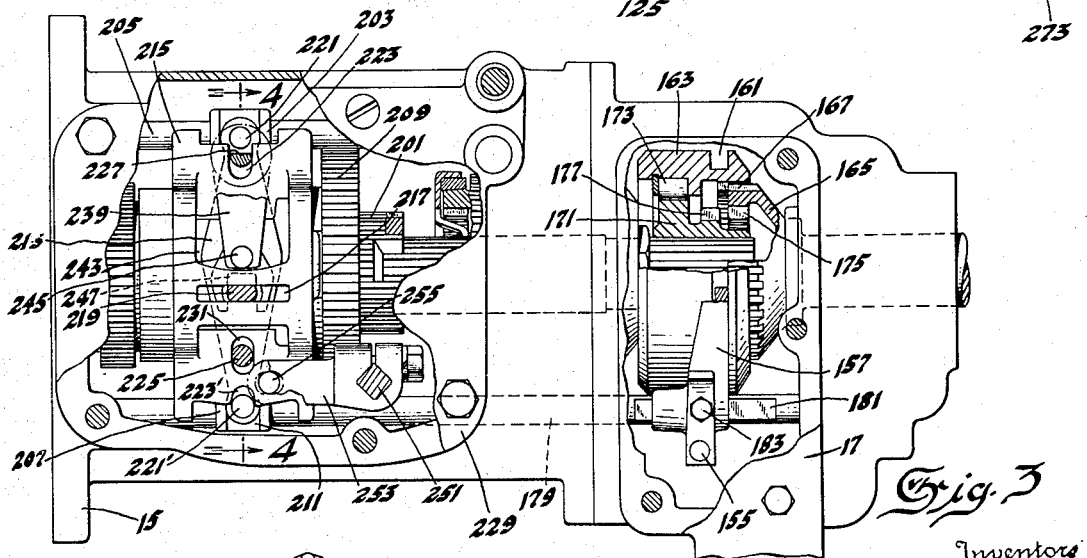
Fig. 3 is a similar view, partly broken away and with some of the control mechanism removed.

The novel mechanism now to be described is operable to make the shifts without resort to manual operation of the shift lever 219. The spindle 237 is rotatably journaled in the cover 229 (see Fig. 4). Within the housing 15 the spindle is provided with a lever arm 239 having an angularly disposed part 241 extending through an opening 243 in the interlocking plate 215. A stud 245 connects the angularly disposed part 241 and the lever 213. The lever 239 is also formed with a forked end 247 underlying the arched part of the interlocking plate 215 and engages the lower end of the shift lever 219. On the outside of the cover 229 a lever arm 249 is secured to the spindle 237. This arm 249 extends toward the rear as shown in Fig. 2. Rocking of the spindle 237 by the rotation of arm 249 operates to rock the lever arm 239, and the latter through the instrumentality of the pin 245 rocks the lever 213 about its anchored end to make gear shifts. This operation, therefore, corresponds in function to the manually effected longitudinal movement of the gear shift lever 219. As a matter of fact the gear shift lever 219 is given its usual longitudinal movements at the same time as a result of the slotted end of the lever arm 239 engaging the lower extremity of the shift lever. Another spindle 251 is also journaled in the cover 229. It has within the housing 15 an arm 253, its end engaging a pin 255 on the interlocking plate 215. Outside the cover 229 the spindle 251 carries a rigid arm 257. Arm 257 is apertured as at 259, and in the aperture is pivoted a lug 261 on a pin 263; the lug is held in abutment with the end of the arm 257 by a spring 265. When the lever arm 253 is rocked by the rotation of the outer arm 257 the interlocking plate is shifted transversely. In so moving the interlocking plate, the shift lever 219 is similarly moved owing to its engagement in the slot 217. In the two positions of adjustment of the interlocking plate the one or the other of the ends of the lever 213 is anchored as explained above.

Figure 8:
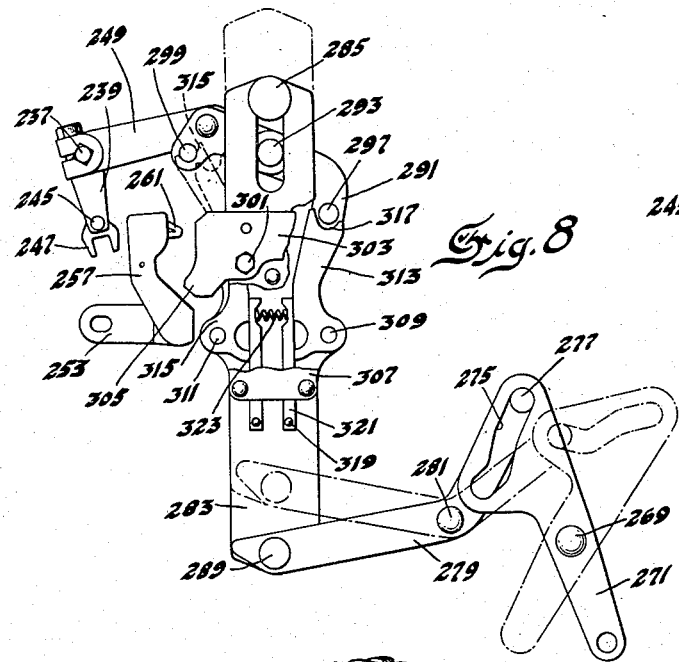
Fig. 8 is a plan view of the control with the parts in second speed position.

The means to operate the lever arm 257 to shift plate 215 from a position adapted for shifting either to low or reverse to a position for shifting to high and second speed and then to operate lever arm 249 to make the several clutch engagements for the speed ratios will next be described. On an extension 267 of the cover of the free wheel housing 17 is a pivot 269 for a lever 271, the end of which is engaged by the forked and slotted end 273 of rod 125. At its other end the lever 271 has a cam slot 275 to receive a pin 277 carried on one end of another lever 279, the latter pivoted at 281 to the same cover extension 267. A slider bar 283 is guided at one end by a pin 285 extending through a slot 287 in the bar. At its other end the slider bar is pivoted as at 289 to the lever 279. A rocker arm 291 has an intermediate fixed pivot pin 293. It has a downwardly directed pin 295 near one end pivotally connecting the rocker arm 291 with the lever arm 249. The rocker arm also has upwardly directed pins 297 and 299 at its extremities for a purpose to be described. Secured by fastening means 301 to the slider bar 283 is a cam plate 303 having a projecting face 305. The slider bar 283 carries a spaced plate 307 secured thereto. At 309 and 311 between the slider bar and the spaced plate are pivoted pawls 313 and 315. Each pawl has a grooved end 317 to engage a pin on the rocker arm 291. Pivotally mounted as at 319 are pivoted bars 321 held apart by a spring 323. These bars engage the pawls and tend to hold them in the position shown by Fig. 2 and Fig. 8. A spring 325 surrounds the pivot 269, is anchored to the parts 267 and the lever 271, and functions to restore the slider bar 283 after it has been moved to effect gear shifting. The pivotal movement of the pawls 313, 315 enables them to accommodate themselves to the movements of the pins 297 and 299 as the latter turn about the center of rotation of the member 291 during the act of gear shifting. The bars 321 operate under the influence of the spring 323 to normally hold the pawls in their retracted position. The pivotal mounting of the lug 261 is to permit its being rotated against the tension of spring 265 by the retracting movement of the projection 305 whenever the lug 261 is in the path of movement of the projection 305 as it moves outwardly.

Figure 6:
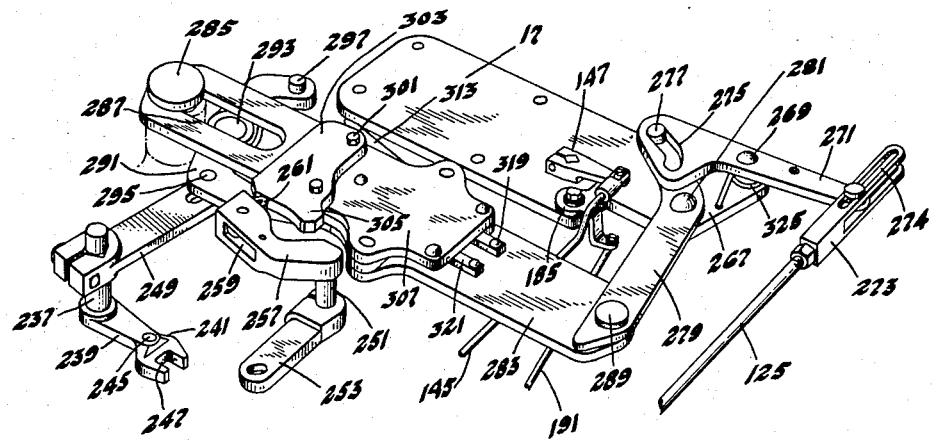
Fig. 6 is a perspective of the control mechanism detached.
Figure 7:
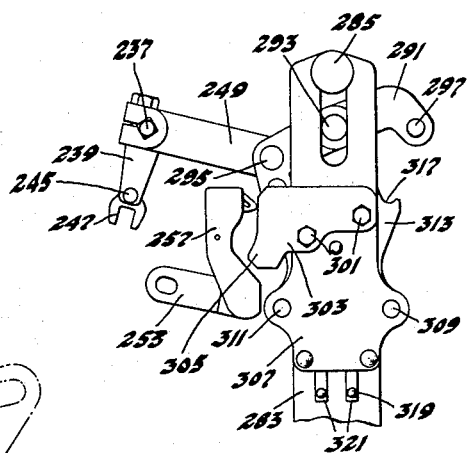
Fig. 7 is a plan view of the control mechanism with the parts in low speed position.

In Fig. 2, which shows the parts in neutral position, it will be seen that spring 323 acts on the bars 321 to hold the pawls 313 and 315 retracted. In this position of the lever 291 and the pawls, the pawls are so positioned that they will not engage the pins 297 and 299 if the slider bar 283 is reciprocated. It will be appreciated, however, that lever may be rocked about its pivot to such an angular position that one or the other of these pins is opposite the end of one of the pawls. In Fig. 6 and Fig. 7 the lever has been rocked by manual operation sufficiently to bring pin 299 opposite the end of pawl 315. This is a low speed driving position. If now bar 283 is reciprocated, pawl 315 pushes on pin 299 and rocks lever 291 about its pivot 293. In so doing the pawl 315 must rock about its pivot 311 to accommodate the arcuate movement of pin 299. However, pawl 313 remains retracted, and when the lever 291 is moving through its mid position the end of pawl 313 moves under pin 297 which, thereafter, moves along the outer wall of the pawl. After the pawl 315 has pushed the lever to the position shown by Fig. 8 a reverse movement of bar 283 brings it to the full line position of Fig. 8. In so moving, the pawl 313 is rocked counterclockwise by the pin 297 and when the pawl 313 is free from the pin the spring 323 positions the pawl such that its grooved end is adjacent the pin 297 in a position to push the pin and rock the lever 291 upon the next forward movement of bar 283. Upon this next movement the end of pawl 315 passes beneath pin 299 as the latter is moving toward the position shown by Fig. 7. Again, on the outward movement of bar 283 pawl 315 is actuated into a position such that its curved end is in a position to rock the lever.

Briefly stated, the above described mechanism includes an operating member in the form of a vacuum cylinder 97, the piston of which is moved (upwardly in the illustrated embodiment) under the influence of vacuum in the engine manifold. This movement of the piston operates to release the clutch and to make gear shifts to second and third speeds, then from third to second, from second to third, and so on progressively. After the completion of each shift the parts assume positions ready for the next shifting movement.

It is very desirable that a free wheeling device should be associated with such an arrangement involving power operation of gear shifting acting progressively. This is especially important because, in its absence and in the event that a careless shift to second should be made when the car speed is high, too great a shock might be given the car and the passengers. To prevent this power operation of gear shifting except when the free wheeling unit is in operation, the button 127, when pulled out to lock the free wheeling unit, simultaneously moves plunger 76 to the left and vents the power cylinder 97 as a result of which the automatic shifting mechanism is not available. Similar venting occurs when the free wheel device is locked out by a shift into reverse.

The operation effected by the movement of the button 65 should also be noted. In Fig. 1 the button is shown in the position when being held by pressure from the operator's foot. This maintains the suction line available. When so held the vacuum cylinder is operable provided the free wheel unit is operable as explained above.

The valve plunger 53 is actuated simultaneously with the throttle lever or accelerator pedal 29. When the latter is released the throttle is closed to idling position and the valve plunger 53 is pulled to the right so that the suction line is opened. If, at the same time, the second plunger is being held by the foot in the position illustrated, and if too the free wheeling unit is not locked out, the suction of the manifold is available to move piston 100. When in the operation of the car the accelerator pedal is released, the piston 100 moves up in the cylinder. Rod 111 releases the clutch and rod 125 operates to rock the levers 271 and 279 and to push the slider bar 283 forward. When thereafter the throttle is opened as by depressing the accelerator pedal, the power cylinder is vented, piston 100 moves down in the cylinder, and rod 111 moves to the left, whereupon the clutch reengages under the influence of its spring. Simultaneously rod 125 moves to the right and spring 325 restores the slider bar to its initial position. The cam slot 275 is so shaped that at the end of the rocking of lever 271, lever 279 is reversely rocked, thus withdrawing the operating pawl from the pin (297 or 299) on the lock bar. The purpose of this feature of the construction is to so remove the automatically operated parts as to permit manual operation of the change speed mechanism to any desired position at any time. At the beginning of the reverse movement of lever 271 the cam slot functions to again push slider bar 283 forward, and the bar then withdraws to its initial position until again shifted by the action of the power cylinder. The slot in the connection 273 is provided to insure the clutch release prior to the gear shifting movements.

When the button 65 is released the vacuum cylinder is vented and the operation of the car is conventional in every respect.

A further brief statement of successive steps in the operation may help to make the action better understood. It will be assumed that the transmission is in neutral (Fig. 2); that the valves are as shown in Fig. 1; that the engine has just been started; and that the clutch is about to be disengaged by the vacuum power unit (the piston 100 moving upward). After the disengagement of the clutch by the power unit the rod 125 will push the slider bar forward from the position shown by Fig. 2 but without moving any of the shift mechanism owing to the position of the rocker arm 291 and the lever arm 257. The operator then manually shifts the lever 219 to its low speed position. In so doing he first moves the lever 219 transversely, the knob end to the left. The lower end therefore moves to the right. In so moving, the lower end moves in the slot 247 of the lever 239. This movement carries the interlocking plate 215 transversely so that it engages pin 221 on the high speed fork 203 whereby this end of the lever 213 becomes its fulcrum. The described movement of plate 215 rocks the lever 253 owing to the connecting pin 255. This action rocks the lever arm 257 swinging it to a position wherein the lug 261 is in the path of movement of the projection 305 on the plate 303. The operator then moves the knob end of the lever toward the rear, the lower end moving forward. As it does so, owing to its engagement with the walls of slot 247, lever arm 239 is rocked with the result that the pin 245 is moved about pivot 237 as a center. In this way the lever 213 is rocked about its fulcrum 221 and the transmission is shifted to low speed. In so doing, the arm 249 also rotates about 237 as a center and, owing to its connection by means of pin 295 with the rocker 291, the latter turns about its pivot 293 and assumes the position shown by Fig. 7 which may be described as the low speed position. The car is then ready to be driven at low speed. As the accelerator pedal is depressed it pushes the plunger 53 into the cylinder bore of the valve unit and vents the power cylinder, whereupon the clutch springs engage the clutch and the car is driven. The rearward movement of the rod 125 has no effect on the gear shift mechanism, owing to the presence of the slot 274. The spring 325 restores the slide bar 283, the lug 261 rocking on its pivot when engaged by projection 305 to permit the restoration of the slide bar to its neutral position.

When the speed of the car has become such that a shift to second speed is desired, the operator releases the pressure on the accelerator pedal. Vacuum is again established between the power cylinder and the manifold. The clutch is withdrawn. After the withdrawal of the clutch the rod 125 swings the levers 271 and 279. Lever 279 pushes the slider bar 283 forward. In moving it forward it rocks lever 291 from the position shown by Fig. 7 toward the position shown in Fig. 8. This movement rocks lever 249, and the movement of 249 brings the lever 213 into its neutral position (carrying the shift lever to its neutral position at the same time).

At this point, and as the lever 291 is passing its mid position, the face 305 on plate 303 engages the lug 261 and rocks the lever arms 257 and 253 and shifts the interlocking plate transversely to a position where its opposite end is locked to the pin 221' on the low speed fork. As the movement of slide bar 283 continues, it completes the rocking of lever 291 and rocks lever 213 about its opposite end and shifts the transmission to second speed. At the end of the shift the cam slot separates the pawls from the pins and the car is ready for driving at second speed. Depression of the accelerator pedal then vents the power cylinder as before and permits reengagement of the clutch. The spring 325 causes a first forward movement of the plate 283 and then a retracting movement so that the parts are ready for the following shift. Thereafter shifts to third speed and second speed occur progressively since the lever arm 257 is out of the path of movement of the cam plate 303. To again shift to low speed or to shift into reverse, manual operation of the shift lever 219 must be resorted to. In the case of shift to low, for example, release of the accelerator pedal vents the power cylinder, releases the clutch, and moves the slider 283 forwardly. A manual shift to low moves the lever 257 to a position in the path of movement of projection 305 which is now in advance of the lug 261. Depression of the accelerator pedal vents the power cylinder, engages the clutch, and withdraws rod 125. The spring 325 pulls back the slider, the lug 261 turning on its pivot 263 against the action of spring 265 to permit the withdrawal of the plate 283 to its release position from which it may again move to shift from low to second and high speeds as explained above.

Since the power cylinder may be vented either by depressing the button 65 or by releasing the accelerator pedal while the button is depressed, it will be seen that for shifting one may hold the button depressed and then release and depress the accelerator pedal, or with the accelerator pedal released one may depress and release the button.

Figure 10:
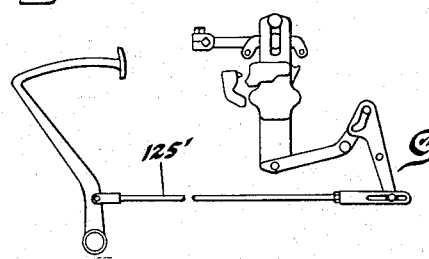
Fig. 10 shows a modification diagrammatically.

It would be possible to make use of the automatic gear shifting mechanism in the absence of the vacuum control by merely connecting an equivalent of rod 125 directly to the clutch pedal, whereupon clutch shifts would make the gear changes substantially as provided in the above description. Such an arrangement is shown in Fig. 10 where rod 125' corresponds to rod 125.

Other obvious changes may be made within the scope of the invention.

It should be mentioned also that when shifting into reverse (which is accomplished by manual operation only) the free wheel lock-out device is necessarily made use of and as explained above this is associated with a venting of the power cylinder through the movement of plunger 76 in precisely the same way as the power unit is vented when actuating the jaw clutch lock-out from the instrument panel button 127.

While the invention may obviously be used with any gear shifting mechanism, its use with change speed gearing employing synchronizing clutches provides for an improved operation.

We claim:

1. In a motor vehicle having an engine, a main clutch, change speed mechanism, and a free wheel clutch the latter having a lock-out device, power means to release the main clutch and shift the change speed mechanism, and mechanism operating in response to the actuation of the lock-out device to render the power means inoperative.

2. The invention defined by claim 1, said power means including a vacuum-operated motor and a communication between said motor and a source of suction, said mechanism comprising a valve operative to vent the line of communication between the motor and the source of suction.

3. The invention defined by claim 1 together with a plurality of means to actuate said lock-out device, one of said means being manually operative and the other being responsive to a movement of the change speed mechanism into its reverse driving position.

4. In a motor vehicle, an engine provided with a throttle valve and a control member therefor, a clutch, a pedal to operate the clutch, a change speed mechanism and a free wheeling clutch, the latter having a lock-out device, power means to release the clutch and to shift the change speed mechanism, said power means including a vacuum-operated motor, a communication thereto from a source of suction, serially arranged valves in said communication, each valve designed to vent the suction line in one position of adjustment and to render the suction line operable in a second position of adjustment, one valve operative in response to movements of the throttle control member, another in response to the lock-out device, and a manually operable member for the third valve.

5. In a motor vehicle, an engine having a source of suction, a fluid motor including a unitary movable member, a conduit from said source of suction to said fluid motor whereby the unbalanced pressure is operable upon said movable member to move the same, a clutch, a change speed mechanism, mechanical connections between said movable member and said clutch and change speed mechanism operable first to release the clutch and thereafter to shift the change speed mechanism.

6. In a motor vehicle, an engine having a source of suction, a fluid motor including a unitary movable member, a conduit from said source of suction to said fluid motor whereby the unbalanced pressure is operable upon said movable member to move the same, a clutch, a change speed mechanism, mechanical connections between said movable member and said clutch and change speed mechanism operable first to release the clutch and thereafter to make a transmission shift from low speed to second speed, and subsequently progressive shifts between second and third speeds, each shift being preceded by a clutch release.

7. In a motor vehicle, an engine, a clutch, change speed mechanism including a high speed shift element, manually operable means for said change speed mechanism, power-operated means to shift said high speed shift element, said power-operated means including mechanism to make a final shifting movement whereby the power shifting may not interfere with the operation of the manually operable means.

8. The invention defined by claim 7, said power-operated means including a transversely moving slide bar, pawls carried thereby, a rocker arm adapted to be rotated by the one or the other of said pawls, connections from said rocker arm to effect longitudinal movements of the high speed shifting element, a lever, means on the slide bar engaging the lever to rock the same, and means whereby the rocking of the lever selects the high speed element for subsequent shifting.

9. In a motor vehicle, a change speed transmission having shift forks, one for high and second speeds and one for low speed and reverse, means movable to lock either one of said forks and to render the other fork operable, said means having a first lever arm, other means to reciprocate the high speed fork, said other means having a second lever arm, power means operable to shift the first arm and thereafter shift the second arm.

10. The invention defined by claim 9 together with a main clutch, mechanism whereby the power-operated means releases the main clutch prior to the operation of the change speed mechanism.

11. In a motor vehicle, an engine, a clutch, change speed mechanism having a plurality of longitudinally movable forks, power-operated means, first means operated thereby to first lock one fork and release the other for longitudinal movement, and second means also operable by the power-operated means to shift the released fork.

12. The invention defined by claim 11, said first means comprising a transversely movable interlocking plate and a lever member having arms, one engaging the interlocking plate and the other operably connected to the power-operated means.

13. The invention defined by claim 11, said second means comprising a lever having a first arm to shift said other fork longitudinally, and a second arm operably connected with the power-operating means.

14. The invention defined by claim 11, said second means comprising a lever having a first arm to shift said other fork longitudinally, a second arm operably connected with the power-operating means, said operable connection including a rock arm pivoted to said lever and having terminal pins to be successively engaged by the power-operated means whereby the rock arm and lever are rotated in opposite directions by successive movements of the power-operated means to make progressive shifts between second and third speeds.

15. In a motor vehicle, a change speed transmission having forks shiftable longitudinally, one for high and second speeds and the other for low and reverse speeds, manually operable means, a mechanism between said manually operable means and said forks whereby the one or the other of said forks is locked and the other fork freed for longitudinal movement and whereby the freed fork may be shifted longitudinally by the manually operable means to make the several shifts, together with power-operated means and other mechanism operated thereby, said other mechanism operable upon said first mentioned mechanism to lock the low speed fork and to subsequently shift the other fork.

16. The invention defined by claim 15, said power-operated means including mechanism operable to leave the transmission at all times subject to control by the manually operable means.

17. Control means for the power transmission of a motor vehicle provided with an engine, a clutch, change speed mechanism and a free wheeling device, the latter equipped with a lock-out contrivance, said control means comprising a power unit operable to sequentially release the clutch and shift the change speed mechanism, and means operated by the engagement of the parts constituting a free wheel lock-out to render the power unit inoperative.

PERRY L. TENNEY.
OLAF RASMUSSEN.